United States Patent Office 2,893,068
Patented July 7, 1959

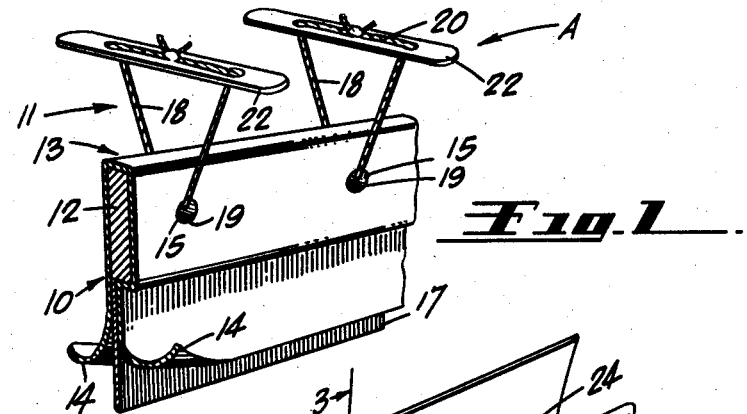
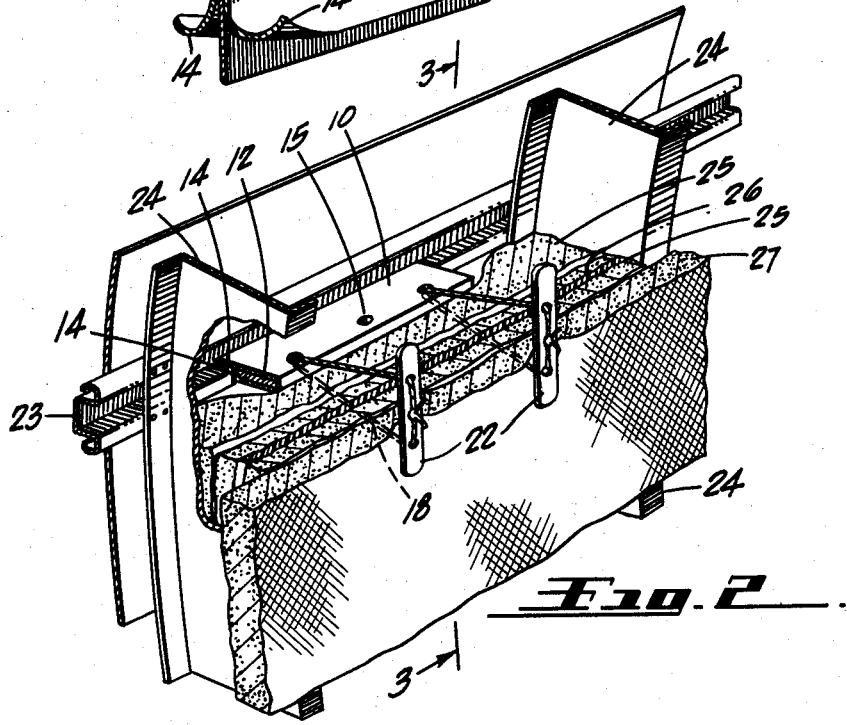
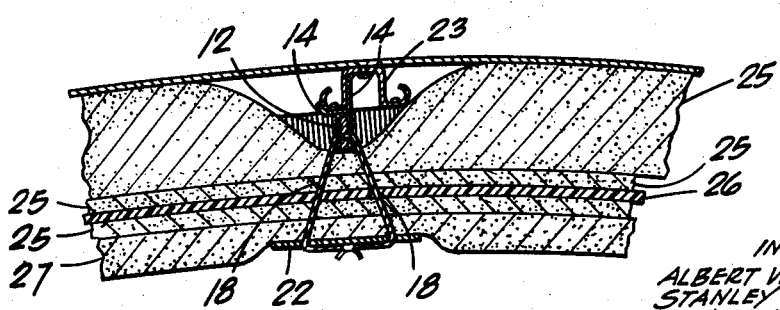

2,893,068

ADHESIVE INSULATION CLIP

Dean T. Johnson, Vista, Albert W. Albertine, Santa Monica, Stanley Lippert, Los Angeles, and Walter F. Sheetz, Hollywood, Calif., assignors to Douglas Aircraft Company, Inc., Santa Monica, Calif.

Application December 17, 1956, Serial No. 628,613

3 Claims. (Cl. 20—4)

This invention deals with insulating blanket means of thermal and acoustic wave-damping material installed to the inner face of hollow aircraft bodies, such as fuselages.

Such blankets, even when carefully installed with rivets, screws, or the like metallic fasteners, tend to, and do, sag downwardly under gravitational forces and become displaced, or even become unanchored, by the vibration of the fuselage as well as by the hogging and sagging workings of the fuselage under flight loads.

This invention provides, in combination with the inner face of a hollow aircraft body that includes a framework of longitudinals intersecting transversals and covered exteriorly by a metallic skin, novel nonmetallic fastening means for securely anchoring a plurality of insulation blankets to the framework against gravity, vibration, hogging and sagging.

Briefly, these and other results are achieved by means of a clip or anchorage or fastener that essentially includes a strip of pressure-sensitive tape having its inner, adhesive coated face folded, preferably unequally, around an elongate, rigid core or base so as to provide a pair of depending, free wings or flaps. The tape and base are provided with registering apertures.

The two wings are directly and pressurally attached to a longitudinal member, preferably, of the framework with the plane of the clip extending in the thicknesswise direction of the hollow body and of the blanketing strips. Separate loops of lacing have their inner bight passed through each of the perforations and extend through the blankets in the thicknesswise direction thereof. The outer bight of each loop lies beyond the exposed face of the blanketing and passes through a retainer strip disposed rectangularly to the loop and bearing tightly on the adjacent face of the blanketing.

By these means and configuration, the blanketing is held tightly to the framework and skin of the fuselage without the use of metallic fasteners such as rivets or screws which are not only difficult to install but eventually damage the blanket by "working." Metallic fasteners, used in quantities, also give rise to appreciable thermal and acoustic deficiencies.

In order to render the inventive concepts more concrete, that one of the many contemplated embodiments of the invention which is at present preferred is illustrated in the accompanying drawings and is described hereinafter in conjunction therewith.

In these drawings:

Figure 1 is a perspective view of the complete fastener, or anchorage, unit or article;

Figure 2 is a fragmentary perspective view of an aircraft fuselage showing the fastener installed and holding blanketing to the framework and skin; and Figure 3 is a sectional view taken on line 3—3 of Figure 2.

The fastener-unit or blanket anchoring article, A, comprises a clip or attachment for adhesive attachment to a longitudinal 23, and blanketing engaging means 11, in combination with the clip.

The clip 10 comprises a base 12 of some such suitable plastic as a phenolic resin, the base being preferably an elongate strip of rectangular cross-section, although naturally other light, rigid material of other cross-sectional shapes are contemplated.

A strip 13 of flexible material, adhesive-coated on its inner face, and comprehending such materials as a pressure-sensitive adhesive tape, is folded, with its adhesive face inward, unequally around base 12 so as to afford a pair of unequal-length flaps or wings 14, the inner face of each of which wings bears a pressure-sensitive adhesive.

Through the tape and base, in the upper portion of the clip, extend one or more grommets or plain perforations 15, and the article, as put on the market, has its wings 14 protected from mutual adherence during storage by an "anti-stick," or protective, spacer 17, which may be a polyethylene.

The clip, as shown in Figures 2 and 3, is adapted to be attached to one of the structural members of the fuselage, preferably a stringer or longeron, along with a plurality of these fastener units, by means of the unequal length wings 14, the longer wing being pressurally attached to the long leg of the hat-section, shown, and the shorter wing being pressurally attached to the rim or flange of the hat section. In this manner, a firm anchorage is obtained, disposing the plane of the reinforced end-portion of the clip projecting in the thicknesswise direction of the blanketing, or at an angle to the wings' attachment base.

In order to utilize the anchorage provided by the clip 10 for firmly securing the blanketing facewise to the framework and the skin, without the impairment of the thermal and acoustical insulating qualities and vibration and "workings" absorbing qualities of the material of the blanketing, consequent upon passing rigid, metallic fasteners somehow thru the blanketing and into the framework or skin, this invention provides the improved means, 18—22, shown.

These means include a loop of lacing 18, of the kind conventionally employed for aircraft work. This lacing is looped through each of the perforations 15 and is tied at its outer bight 20, as shown, thus including an inner bight 19 and an outer bight 20. The lacing passes in the thicknesswise direction through the blanketing, in the manner of stitching, so as to need no perforation of the blanketing to receive it therethrough. Thus, among other advantages the large holes pre-formed through the blanket and heretofore required for fastening the blanketing with rivets or screws, are eliminated, as well as the concomitant danger of the blanketing tearing around these rivets, etc., under gravity, vibration and "working" loads.

It is preferable to also employ a blanketing-retainer strip 22 at the outer bight of the loop and to this end the retainer strip 22 may be disposed rectangularly to the loop, clip, and longeron, lying in facewise contact with the exposed face of the "over-frame" blanketing, 27. It is pulled sufficiently tightly against the blanketing by the lacing to prevent, in conjunction with other such anchoring means on this and other longerons, the displacement or sagging of the blanketing by gravity, vibration or fuselage "working."

The layers 25 may be united adhesively together, if desired, by a vinylite layer 26, which serves, among other things, as a reinforcement for these thinner intercostal strips, 25.

Although certain specific compositions and framing have been referred to in rendering the description more concrete, it is to be understood that various changes and modifications may be made therein without departing from the invention as defined in the following claims.

We claim:

1. A fastener for anchoring to a support an insulation blanket composed of material incapable of sustaining itself and susceptible to sagging, comprising: a substantially rigid base-member extending adjacent to the support; a strip of pressure-sensitive adhesive material enfolding said base-member so as to afford a pair of free flaps for adhering to said support and thereby fixing said base-member to said support, the base member and said strip including a pair of sets of longitudinally spaced, registering apertures therein; a loop of lacing material having a first bight extending through said apertures and having a second bight protruding inwardly from said base member and lying substantially at right angles thereto; and a rigid retainer-member for seizing an extensive area of the inner face of the blanket and anchoring the latter to said support, said retainer-member being disposed at the outer end of said second bight and said retainer members lying at right angles to said base-member, said second bight passing through said retainer-member and seizing same so as to clampingly engage said retainer strip facewise against a blanket of saggable insulating material and thereby fasten the latter to the support therefor so as to prevent sagging thereof.

2. A fastener for anchoring to a support an insulation blanket composed of material incapable of sustaining itself and susceptible to sagging, comprising: a substantially rigid, elongate base-member extending longitudinally of the support; a strip of pressure-sensitive adhesive material enfolding said base-member so as to afford a pair of free flaps for adhering facewise to said support and thereby fixing the fastener-base to said support, the base-member and said enfolding material including a pair of sets of longitudinally spaced, registering perforations therein; a loop of flexible fibrous lacing material having a first bight extending through the perforations and having a second bight protruding inwardly from said base member and lying substantially at right angles thereto; and a free, rigid, elongate and wide frictional clamping-strip disposed at the outer end of said second bight and extending rectangularly to the base-member, said clamping-strip including a pair of longitudinally spaced perforations for receiving said second bight therethrough so as to clampingly-engage said clamping strip against the inner face of a blanket of saggable insulating material to be fastened stably to said support by said fastener and prevented thereby from sagging.

3. In combination: a support, an expanse of substantially soft insulating material incapable of independently maintaining, against gravity, its original shape and position with respect to said support and susceptible to sagging, and fastening means for fastening said expanse to said support in such a manner as to prevent sagging of said expanse, said fastening means comprising a rigid base member disposed adjacent said support in longitudinally extending attitude and including a strip of pressure-sensitive material enfolding said base-member so as to afford a pair of flaps for adhering to said support so as to fix said base member in said longitudinal attitude outwardly of the outer face of said expanse; laterally spaced, elongate and wide clamping-plates disposed in facewise contact with the inner face of said expanse and extending substantially laterally with respect to said base member; and a flexible tensile member uniting each of said plates to the fixed base member under a tension sufficient to clampingly hold said wide plates in extensive contact with said expanse so as to hold said expanse to said support and prevent sagging thereof.

References Cited in the file of this patent

UNITED STATES PATENTS

| 2,111,326 | Norris | Mar. 15, 1938 |
| 2,580,231 | Lamm | Dec. 25, 1951 |
| 2,647,711 | Margulis | Aug. 4, 1953 |

FOREIGN PATENTS

| 1,022,731 | France | Dec. 17, 1952 |